(12) United States Patent
Lien et al.

(10) Patent No.: US 11,587,745 B1
(45) Date of Patent: Feb. 21, 2023

(54) BACKLIGHT MODULE

(71) Applicant: Chicony Power Technology Co., Ltd., New Taipei (TW)

(72) Inventors: Fang-Yi Lien, New Taipei (TW); Hsuan-Wei Ho, New Taipei (TW); Tsung-Hsun Chen, New Taipei (TW)

(73) Assignee: Chicony Power Technology Co, Ltd., New Taipei (TW)

( * ) Notice: Subject to any disclaimer, the term of this patent is extended or adjusted under 35 U.S.C. 154(b) by 0 days.

(21) Appl. No.: 17/660,417

(22) Filed: Apr. 24, 2022

(30) Foreign Application Priority Data

Feb. 16, 2022 (TW) .................................. 111105631

(51) Int. Cl.
*H01H 13/83* (2006.01)
*F21V 8/00* (2006.01)

(52) U.S. Cl.
CPC ........... *H01H 13/83* (2013.01); *G02B 6/0055* (2013.01); *G02B 6/0083* (2013.01); *H01H 2219/062* (2013.01)

(58) Field of Classification Search
CPC ................ G02B 6/0083; G02B 6/0055; H01H 2219/063; H01H 13/83
See application file for complete search history.

(56) References Cited

U.S. PATENT DOCUMENTS

| | | | |
|---|---|---|---|
| 2012/0120656 A1 | 5/2012 | Ajichi et al. | |
| 2020/0043681 A1* | 2/2020 | Chen | G06F 3/0213 |
| 2022/0244792 A1* | 8/2022 | Hsu | G02B 6/0055 |

FOREIGN PATENT DOCUMENTS

| | | | |
|---|---|---|---|
| CN | 101963336 A | 2/2011 | |
| CN | 213691839 U | 7/2021 | |
| TW | 201105185 A1 | 2/2011 | |
| TW | I587340 B | 6/2017 | |
| TW | I607471 B | 12/2017 | |
| TW | I689959 B | 4/2020 | |
| TW | M596891 U | 6/2020 | |
| TW | M603188 U | 10/2020 | |
| TW | 202206979 A * | 2/2022 | G02B 6/0068 |

* cited by examiner

*Primary Examiner* — Anabel Ton
(74) *Attorney, Agent, or Firm* — CKC & Partners Co., LLC (57) ABSTRACT

A backlight module includes a circuit board, a light-shielding plate, and a light guide plate. The circuit board is provided with first and second light-emitting units. The light-shielding plate is disposed above the circuit board. The light guide plate is disposed between the circuit board and the light-shielding plate and includes first and second single-key light guide areas. The first and second single-key light guide areas respectively have first and second through holes respectively accommodating the first and second light-emitting units. A distance between the geometric center of the first single-key light guide area and that of the light guide plate is greater than a distance between the geometric center of the second single-key light guide area and that of the light guide plate. A current flowing through the first light-emitting unit is greater than a current flowing through the second light-emitting unit.

11 Claims, 9 Drawing Sheets

BACKLIGHT MODULE

CROSS-REFERENCE TO RELATED APPLICATION

This application claims priority to Taiwan Application Serial Number 111105631, filed Feb. 16, 2022, which is herein incorporated by reference.

BACKGROUND

Technical Field

The present disclosure relates to a keyboard device, and more particularly, to a backlight module used in a keyboard device.

Description of Related Art

The appearances of traditional keyboards are usually monotonous and dull, so computer peripheral manufacturers have developed light-emitting keyboards with excellent visual effects. The light-emitting keyboards have backlight modules. The backlight modules used in the traditional keyboards are composed of two parts, which are the light-shielding layers and the light bars from top to bottom.

Although the designs of the backlight modules of the traditional keyboards are simple, their thicknesses cannot meet the market demand due to the thinning trend of the backlight module. With the evolution of the LED generation, the backlight module of an existing keyboard uses a light-emitting module with a light-emitting element of a smaller size and a light guide plate to achieve thinning in thickness. In order to effectively improve the brightness, the most direct way is to shorten the distance between the light guide plate and the light-emitting element. However, when the light-emitting module expands and contracts due to temperature changes, the relative position between the light-emitting element and the light guide plate may be offset, especially in the area away from the geometric center of the light guide plate (for example, the area on both sides of the keyboard). The above offset may cause uneven light energy or poor light efficiency, and may also cause the light guide plate to touch the light-emitting element, thereby causing the encapsulant (e.g., silicone gel) of the light-emitting element to crack or fall off.

Accordingly, how to provide a backlight module to solve the aforementioned problems becomes an important issue to be solved by those in the industry.

SUMMARY

An aspect of the disclosure is to provide a backlight module that can efficiently solve the aforementioned problems.

According to an embodiment of the disclosure, a backlight module includes a circuit board, a light-shielding plate, and a light guide plate. The circuit board is provided with a first light-emitting unit and a second light-emitting unit. The light-shielding plate is disposed above the circuit board and has a shielding area. The light guide plate is disposed between the circuit board and the light-shielding plate and includes a first single-key light guide area and a second single-key light guide area. The first single-key light guide area has a first through hole accommodating the first light-emitting unit. The second single-key light guide area has a second through hole accommodating the second light-emitting unit. A distance between a geometric center of the first single-key light guide area and a geometric center of the light guide plate is greater than a distance between a geometric center of the second single-key light guide area and the geometric center of the light guide plate. A current flowing through the first light-emitting unit is greater than a current flowing through the second light-emitting unit.

In an embodiment of the disclosure, an area of the first through hole is greater than an area of the second through hole.

In an embodiment of the disclosure, the light guide plate further includes an opaque area. The opaque area has a first expansion/contraction hole disposed corresponding to the shielding area.

In an embodiment of the disclosure, an area of the first expansion/contraction hole is greater than an area of the first through hole or an area of the second through hole.

In an embodiment of the disclosure, the backlight module further includes a reflective layer disposed between the light guide plate and the circuit board. The light-shielding plate covers an upper end of the first expansion/contraction hole. The reflective layer covers a lower end of the first expansion/contraction hole.

In an embodiment of the disclosure, the opaque area further has a second expansion/contraction hole disposed corresponding to the shielding area. A distance between a geometric center of the first expansion/contraction hole and the geometric center of the light guide plate is smaller than a distance between a geometric center of the second expansion/contraction hole and the geometric center of the light guide plate. An area of the first expansion/contraction hole is greater than an area of the second expansion/contraction hole.

In an embodiment of the disclosure, the circuit board has a third expansion/contraction hole disposed corresponding to the shielding area. A vertical position of the third expansion/contraction hole does not overlap or partially overlaps a vertical position of the first expansion/contraction hole or a vertical position of the second expansion/contraction hole.

In an embodiment of the disclosure, the opaque area further has a second expansion/contraction hole disposed corresponding to the shielding area. A geometric center of the first expansion/contraction hole and a geometric center of the second expansion/contraction hole are respectively at substantially the same distance from the geometric center of the light guide plate. A distance between the geometric center of the first expansion/contraction hole and a first short edge of the light guide plate is substantially equal to a distance between the geometric center of the second expansion/contraction hole and a second short edge of the light guide plate. A distance between the geometric center of the first expansion/contraction hole and a first long edge of the light guide plate is substantially equal to a distance between the geometric center of the second expansion/contraction hole and a second long edge of the light guide plate.

In an embodiment of the disclosure, the first expansion/contraction hole is located between the first light-emitting unit and the second light-emitting unit, and is configured to block optical crosstalk between the first light-emitting unit and the second light-emitting unit.

In an embodiment of the disclosure, one of the light-shielding plate and the circuit board is adhered to the light guide plate through a first connection member.

In an embodiment of the disclosure, another of the light-shielding plate and the circuit board is adhered to the light guide plate through a second connection member.

In an embodiment of the disclosure, vertical positions of the first connection member and the second connection member relative to the shielding area do not overlap or partially overlap.

Accordingly, in the backlight module of the present disclosure, by making the current flowing through the first light-emitting unit farther from the geometric center of the light guide plate greater than the current flowing through the second light-emitting unit closer to the geometric center of the light guide plate, the problem of uneven light energy or poor light efficiency of the first light-emitting unit caused by the expansion and contraction of the light guide plate and the circuit board can be improved. By making the area of the first through hole of the light guide plate for accommodating the first light-emitting unit larger than the area of the second through hole for accommodating the second light-emitting unit, the problem that the light guide plate collides with the first light-emitting unit due to expansion and contraction can be effectively avoided. By disposing an expansion/contraction hole in the opaque area of the light guide plate, the amount of expansion and contraction of the light guide plate when the temperature changes can be effectively reduced. By covering the upper end and the lower end of the expansion/contraction hole with the light-shielding plate and the reflective layer respectively, light leakage at the expansion/contraction hole can be avoided. By making the area of the expansion/contraction hole farther from the geometric center of the light guide plate smaller, the light guide plate can achieve a balance between the amount of expansion and contraction and the structural strength. By disposing an expansion/contraction hole on the circuit board, in addition to effectively reducing the amount of expansion and contraction of the circuit board when the temperature changes, the expansion/contraction hole can also be used as an air vent between the light guide plate and the circuit board. By adhering connection members between the light-shielding plate and the light guide plate and/or between the circuit board and the light guide plate, the light guide plate and at least one of the light-shielding plate and the circuit board can have substantially the same or similar amount of expansion and contraction, thereby further ensuring that the light guide plate does not collide with the first light-emitting unit. By making the connection member adhered between the light-shielding plate and the light guide plate and the connection member adhered between the circuit board and the light guide plate staggered, the overall thickness of the backlight module can be prevented from being too large.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 1:
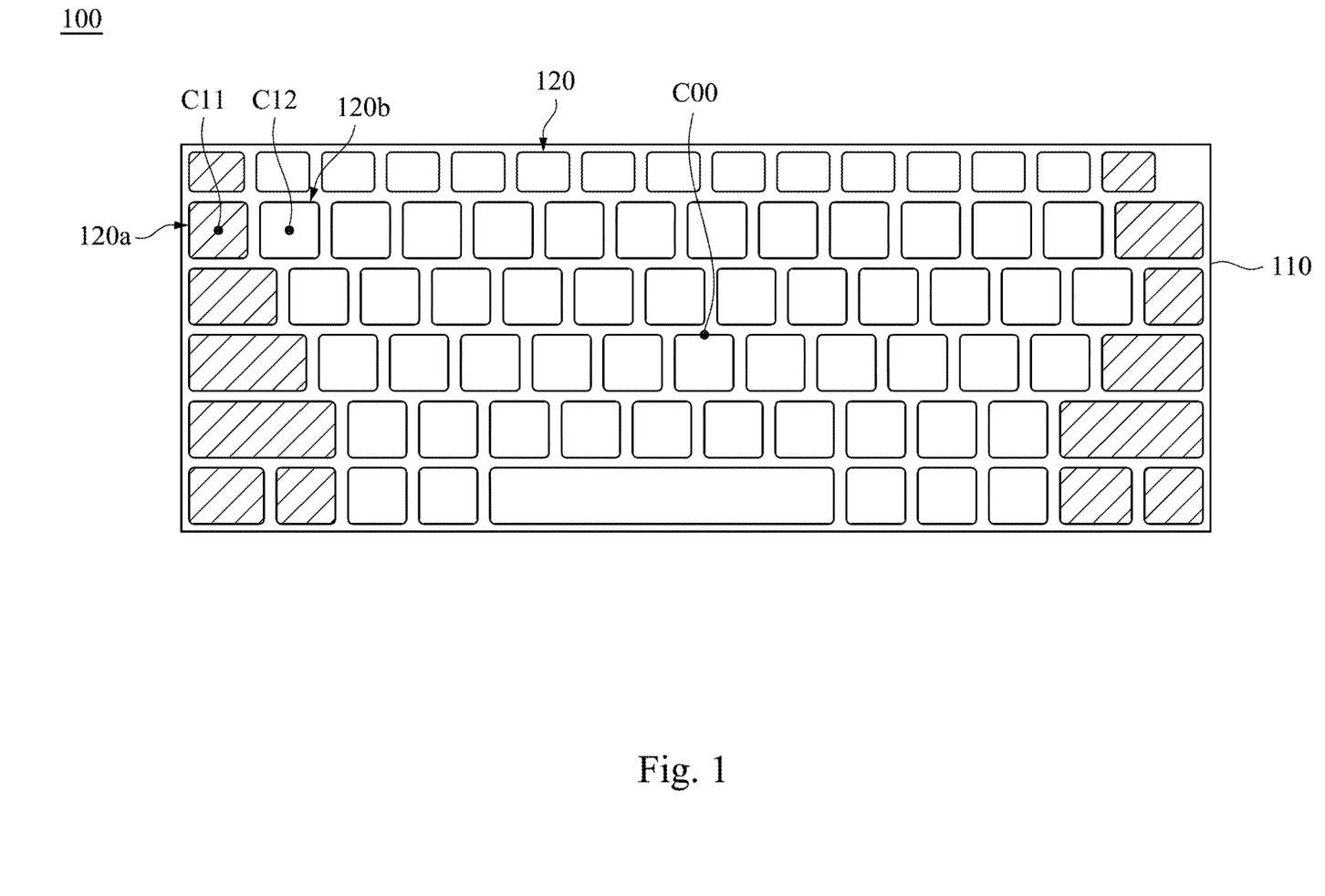
FIG. 1 is a top view of a keyboard device according to an embodiment of the disclosure.

Reference is made to FIG. 1. FIG. 1 is a top view of a keyboard device 100 according to an embodiment of the disclosure. As shown in FIG. 1, in the present embodiment, the keyboard device 100 includes a bottom plate 110, a plurality of keyswitch assemblies 120, and a backlight module 200 (marked in FIG. 2). The keyswitch assemblies 120 are disposed over the bottom plate 110 and configured for the user to press. The backlight module 200 is disposed between the bottom plate 110 and the keyswitch assemblies 120, and is configured to emit light toward the keyswitch assemblies 120, so that the keyboard device 100 becomes a light-emitting keyboard. In addition, the keyboard device 100 of the disclosure may be an external keyboard (e.g., a keyboard with a PS/2 interface or a keyboard with a USB interface) used in a desktop computer, or may be a part of a computer system having an input device (e.g., a touch pad on a notebook computer) that is in the form of a keyswitch, but the disclosure is not limited in this regard. That is, concepts of the keyboard device 100 of the disclosure may be used in any electronic product that performs input function by pressing.

As shown in FIG. 1, in the present embodiment, the keyswitch assemblies 120 of the keyboard device 100 may be mainly divided into keyswitch assemblies 120 located on both sides of the keyboard device 100 (such as the keyswitch assembly 120a marked with slashes) and keyswitch assemblies 120 located in the middle area of the keyboard device 100 (such as the keyswitch assembly 120b).

Figure 2:
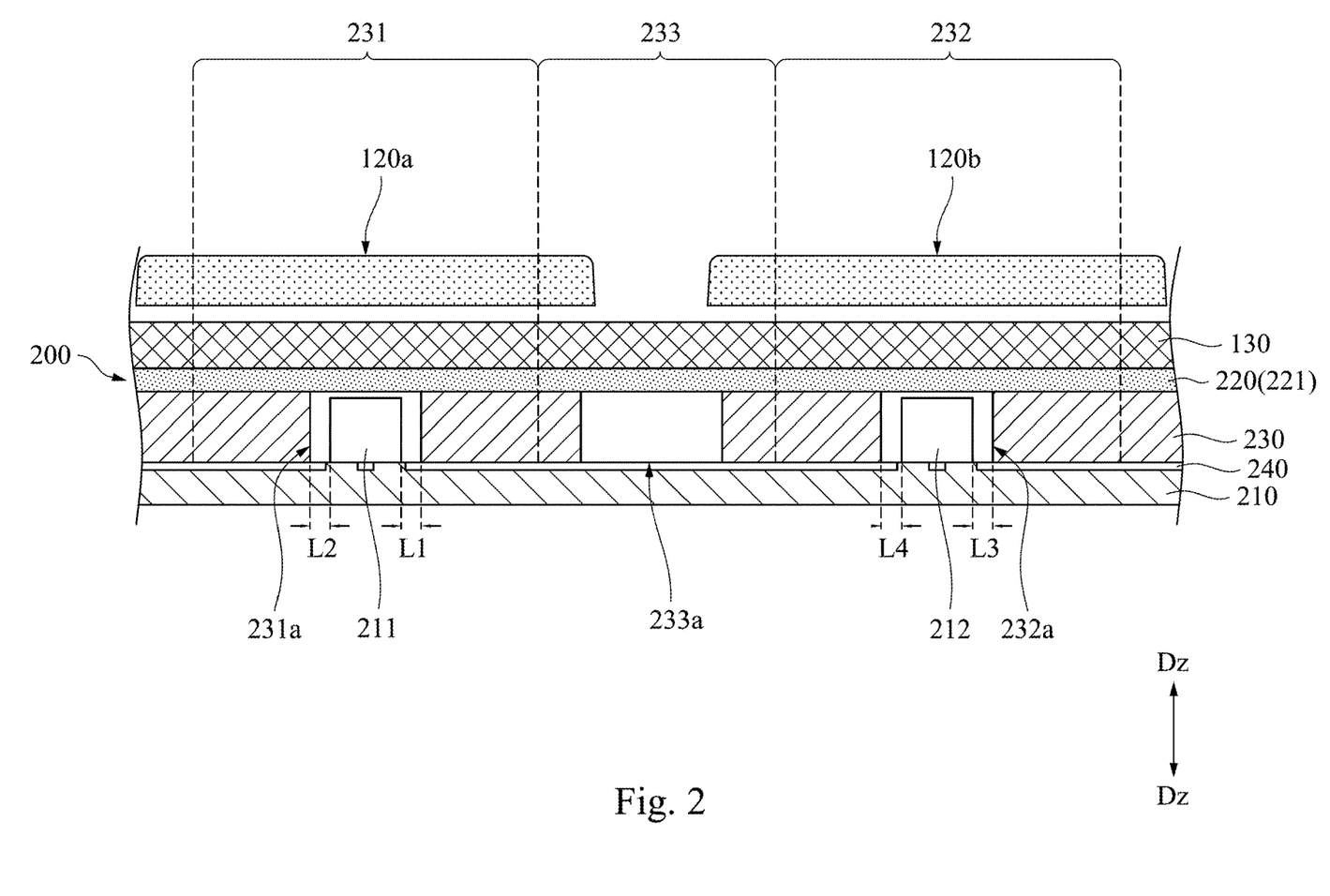
FIG. 2 is a partial cross-sectional view of the keyboard device in FIG. 1.
Figure 3:
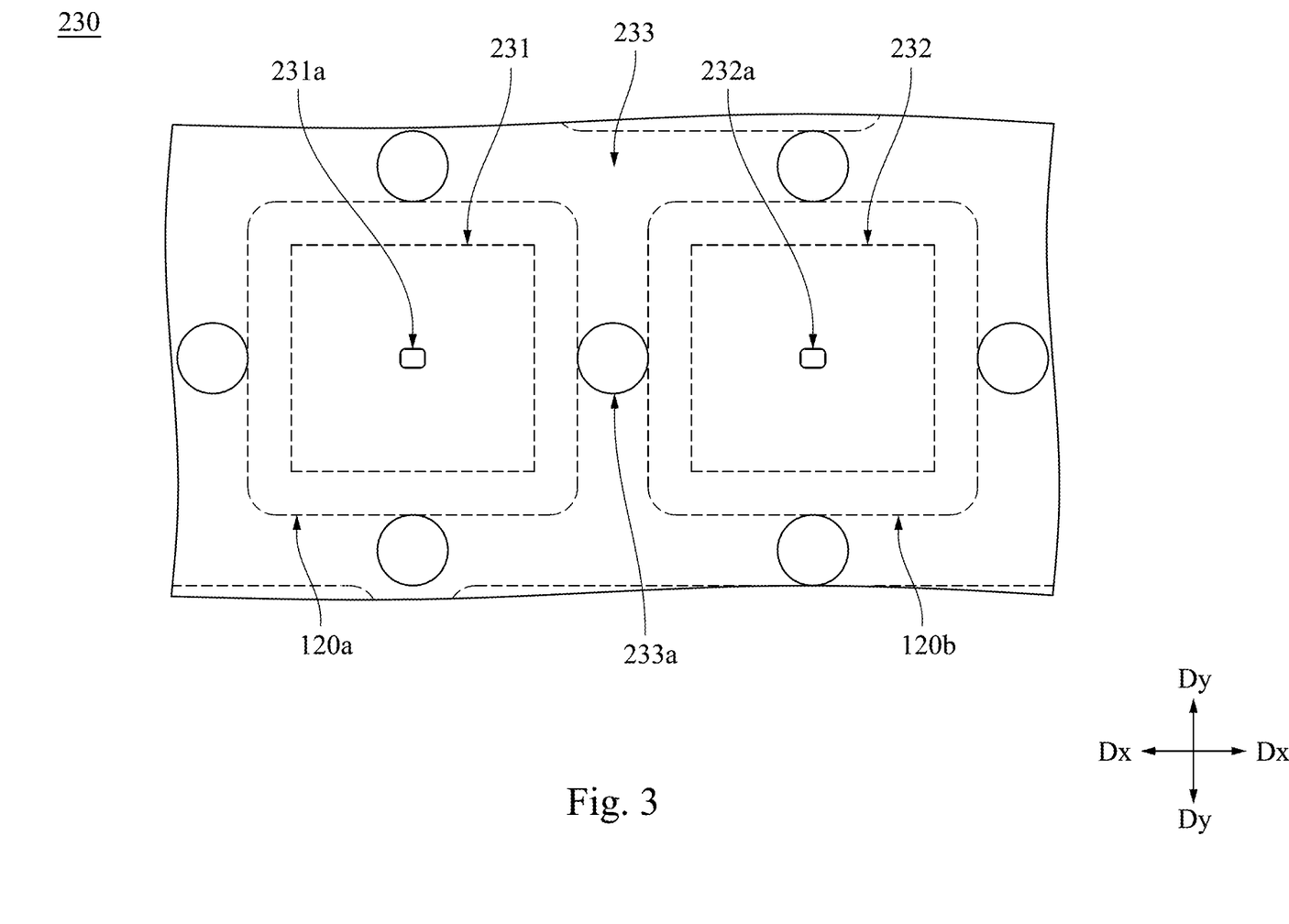
FIG. 3 is a partial top view of a light guide plate in FIG. 1.

Reference is made to FIGS. 2 and 3. FIG. 2 is a partial cross-sectional view of the keyboard device 100 in FIG. 1. FIG. 3 is a partial top view of a light guide plate 230 in FIG. 1. As shown in FIGS. 2 and 3, in the present embodiment, the keyswitch assemblies 120 are disposed on the backlight module 200 through a bracket 130. The connection between the keyswitch assemblies 120 and the bracket 130 may adopt various existing technologies (for example, scissor-type support and guide structures), which will not be described in detail here. The backlight module 200 includes a circuit board 210, a light-shielding plate 220, and a light guide plate 230. The circuit board 210 is provided with a plurality of light-emitting units respectively located under the keyswitch assemblies 120, in which a first light-emitting unit 211 and a second light-emitting unit 212 are presented in FIGS. 2 and 3. The light-emitting units may be, but not limited to, light-emitting diodes (LED). The light-shielding plate 220 is disposed above the circuit board 210 and has a shielding area 221. The light guide plate 230 disposed between the circuit board 210 and the light-shielding plate 220 and includes a first single-key light guide area 231, a second single-key light guide area 232, and an opaque area 233. It should be noted that in FIG. 3, the two large dashed boxes respectively indicate the keyswitch assemblies 120a, 120b, and the two small dashed boxes respectively indicate the first single-key light guide area 231 and the second single-key light guide area 232.

For example, the first single-key light guide area 231 and the second single-key light guide area 232 are respectively defined by the orthographic projections of the keyswitch assemblies 120a, 120b on the light guide plate 230, but the disclosure is not limited thereto. The first single-key light guide area 231 has a first through hole 231a accommodating the first light-emitting unit 211. The second single-key light guide area 232 has a second through hole 232a accommodating the second light-emitting unit 212. The opaque area 233 is located between the first single-key light guide area 231 and the second single-key light guide area 232. For example, the opaque area 233 is at least an area of the light guide plate 230 connected between the first single-key light guide area 231 and the second single-key light guide area 232. The shielding area 221 of the light-shielding plate 220 corresponds to the opaque area 233 in a vertical direction Dz.

The light emitted by the first light-emitting unit 211 enters the first single-key light guide area 231 of the light guide plate 230 through the inner wall of the first through hole 231a. The light emitted by the second light-emitting unit 212 enters the second single-key light guide area 232 of the light guide plate 230 through the inner wall of the second through hole 232a. In some embodiments, the bottoms of the first single-key light guide area 231 and the second single-key light guide area 232 respectively include microstructure portions (not shown). The microstructure portions surround the first light-emitting unit 211 and the second light-emitting unit 212 to guide the light emitted by the first light-emitting unit 211 and the second light-emitting unit 212 to the light-shielding plate 220. In practical applications, the light-shielding plate 220 is provided with two light-transmitting areas (not shown). The two light-transmitting areas correspond to the keyswitch assemblies 120a, 120b respectively. Therefore, the light emitted by the first light-emitting unit 211 and the second light-emitting unit 212 can be accurately irradiated to the aforementioned keyswitch assemblies 120a, 120b respectively after passing through the two light-transmitting areas. For example, the areas of the two light-transmitting areas are respectively smaller than the areas of the first single-key light guide area 231 and the second single-key light guide area 232, and are aligned with the central regions of the aforementioned two keyswitch assemblies 120a, 120b respectively, but the disclosure is not limited in this regard. It should be noted that the aforementioned areas are areas viewed from a plan view of the light-shielding plate 220 along the vertical direction Dz.

As shown in FIG. 2, in the present embodiment, the backlight module 200 further includes a reflective layer 240. The reflective layer 240 is disposed between the light guide plate 230 and the circuit board 210, and is configured to reflect the light incident on the light guide plate 230 from the first light-emitting unit 211 and the second light-emitting unit 212 upward, thereby effectively reducing light loss.

As shown in FIG. 1, in the present embodiment, a geometric center C11 of the first single-key light guide area 231 and a geometric center C12 of the second single-key light guide area 232 are located under the keyswitch assemblies 120a, 120b, respectively. As mentioned above, the keyswitch assembly 120a is classified as one of the keyswitch assemblies 120 located in the middle area of the keyboard device 100, and the keyswitch assembly 120b is classified as one of the keyswitch assemblies 120 located in the two side areas of the keyboard device 100. Therefore, the distance between the geometric center C11 of the first single-key light guide area 231 and a geometric center C00 of the light guide plate 230 is greater than the distance between the geometric center C12 of the second single-key light guide area 232 and the geometric center C00 of the light guide plate 230. The first light-emitting unit 211 and the second light-emitting unit 212 are substantially located at the geometric center C11 of the first single-key light guide area 231 and the geometric center C12 of the second single-key light guide area 232, respectively. It can be seen from this that the first light-emitting unit 211 is further away from the geometric center C00 of the light guide plate 230 than the second light-emitting unit 212.

It should be noted that when the temperature changes and the expansion and contraction occurs, the relative positions between the light-emitting units located on the two sides of the keyboard device 100 and the light guide plate 230 are significantly shifted (so the light-emitting units located on the two sides of the keyboard device 100 are more likely to collide with the light guide plate 230), so that locally darker blocks may appear on the single-key light guide areas located on both sides of the keyboard device 100 (e.g., the darker block may appear on a side of the single-key light guide area farther from the light-emitting unit). Since the first light-emitting unit 211 is further away from the geometric center C00 of the light guide plate 230 than the second light-emitting unit 212, the light efficiency of the first light-emitting unit 211 is more easily affected by the expansion and contraction of the light guide plate 230 and the circuit board 210. In the backlight module 200 of the present embodiment, the current flowing through the first light-emitting unit 211 is greater than the current flowing through the second light-emitting unit 212. In this way, the brightness of the light emitted by the first light-emitting unit 211 can be made greater than the brightness of the light emitted by the second light-emitting unit 212, thereby compensating for and overcoming the problem of uneven light intensity or poor light efficiency of the first light-emitting unit 211 caused by the expansion and contraction of the light guide plate 230 and the circuit board 210.

In some embodiments, the light-emitting units located under the keyswitch assemblies 120 in the two sides of the keyboard device 100 may use the same circuit, while the light-emitting units located under the keyswitch assemblies 120 in the middle area of the keyboard device 100 may use another circuit. These two circuits use different resistor configurations to control the magnitude of the current flowing through each light-emitting unit, so as to improve the overall light efficiency of the backlight module 200. In some other embodiments, the circuits of all light-emitting units may be independent, so as to control the magnitude of the current flowing through each light-emitting unit individually.

Compared with the second light-emitting unit 212, the first light-emitting unit 211 is more likely to collide with the light guide plate 230. In some embodiments, the area of the first through hole 231a of the light guide plate 230 for accommodating the first light-emitting unit 211 may be larger than the area of the second through hole 232a of the light guide plate 230 for accommodating the second light-emitting unit 212. By making the area of the first through hole 231a larger than the area of the second through hole 232a, the problem that the light guide plate 230 collides with the first light-emitting unit 211 due to expansion and contraction can be effectively avoided. It should be noted that the aforementioned areas are areas viewed from a plan view of the light guide plate 230 along the vertical direction Dz.

As shown in FIGS. 2 and 3, in the present embodiment, the opaque area 233 of the light guide plate 230 has a plurality of expansion/contraction holes 233a disposed corresponding to the shielding area 221. Although the expansion/contraction holes 233a are shown as being substantially circular in the figures, the expansion/contraction holes 233a may have any suitable shape, such as a triangle, a rectangle, a polygon, an ellipse or the like, but the present disclosure is not limited thereto. By disposing the expansion/contraction holes 233a in the opaque area 233 of the light guide plate 230, the light guide plate 230 can have space to release the deformation caused by the expansion when the light guide plate 230 expands, so the amount of expansion and contraction of the light guide plate 230 can be effectively reduced when the temperature changes. In some embodiments, in order to make the expansion/contraction holes 233a have a significant effect, the areas of the expansion/contraction holes 233a may be made larger than the area of the first through hole 231a or the area of the second through hole 232a. It should be noted that the aforementioned areas are areas viewed from a plan view of the light guide plate 230 along the vertical direction Dz.

As shown in FIG. 2, in the present embodiment, the first light-emitting unit 211 is separated from the right inner wall and the left inner wall of the first through hole 231a by distances L1, L2 respectively, and the second light-emitting unit 212 is separated from the right inner wall and the left inner wall of the second through hole 232a by distances L3, L4, respectively. It should be noted that no matter which of the thermal expansion coefficients of the light guide plate 230 and the circuit board 210 is larger, both of them will contract inward when heated, especially in the longitudinal direction. Therefore, for the first through hole 231a located under the keyswitch assembly 120a on the left side of the keyboard device 100, the distance L1 and the distance L2 can be pre-designed to be different, so that the position of the first light-emitting unit 211 after the expansion and contraction occurs can be closer to the center of the first through hole 231a. For example, if it is known that the first light-emitting unit 211 is moved toward the right inner wall of the first through hole 231a after the expansion and contraction, the distance L1 can be pre-designed to be greater than the distance L2, and vice versa. For the through holes located under the keyswitch assemblies 120a on the right side of the keyboard device 100, the distances from the first light-emitting unit 211 to the left and right inner walls may be pre-designed in an opposite way. For the second through hole 232a located under the keyswitch assembly 120b in the middle area of the keyboard device 100, the distance L3 may be substantially equal to the distance L4.

As shown in FIG. 2, in the present embodiment, the expansion/contraction hole 233a is located between the first light-emitting unit 211 and the second light-emitting unit 212, and is configured to block optical crosstalk between the first light-emitting unit 211 and the second light-emitting unit 212. That is, the light emitted from the first light-emitting unit 211 and traveling in a direction toward the second light-emitting unit 212 can be prevented from entering the second single-key light guide area 232 by the blocking of the expansion/contraction hole 233a, and the light emitted from the second light-emitting unit 212 and traveling in a direction toward the first light-emitting unit 211 can also be prevented from entering the first single-key light guide area 231 by the blocking of the expansion/contraction hole 233a. In addition, the light-shielding plate 220 covers the upper end of the expansion/contraction hole 233a. The reflective layer 240 covers the lower ends of the expansion/contraction hole 233a. In this way, the light emitted by the first light-emitting unit 211 and the second light-emitting unit 212 can be prevented from leaking from the upper end and the lower end of the expansion/contraction hole 233a after entering the expansion/contraction hole 233a.

Figure 4:
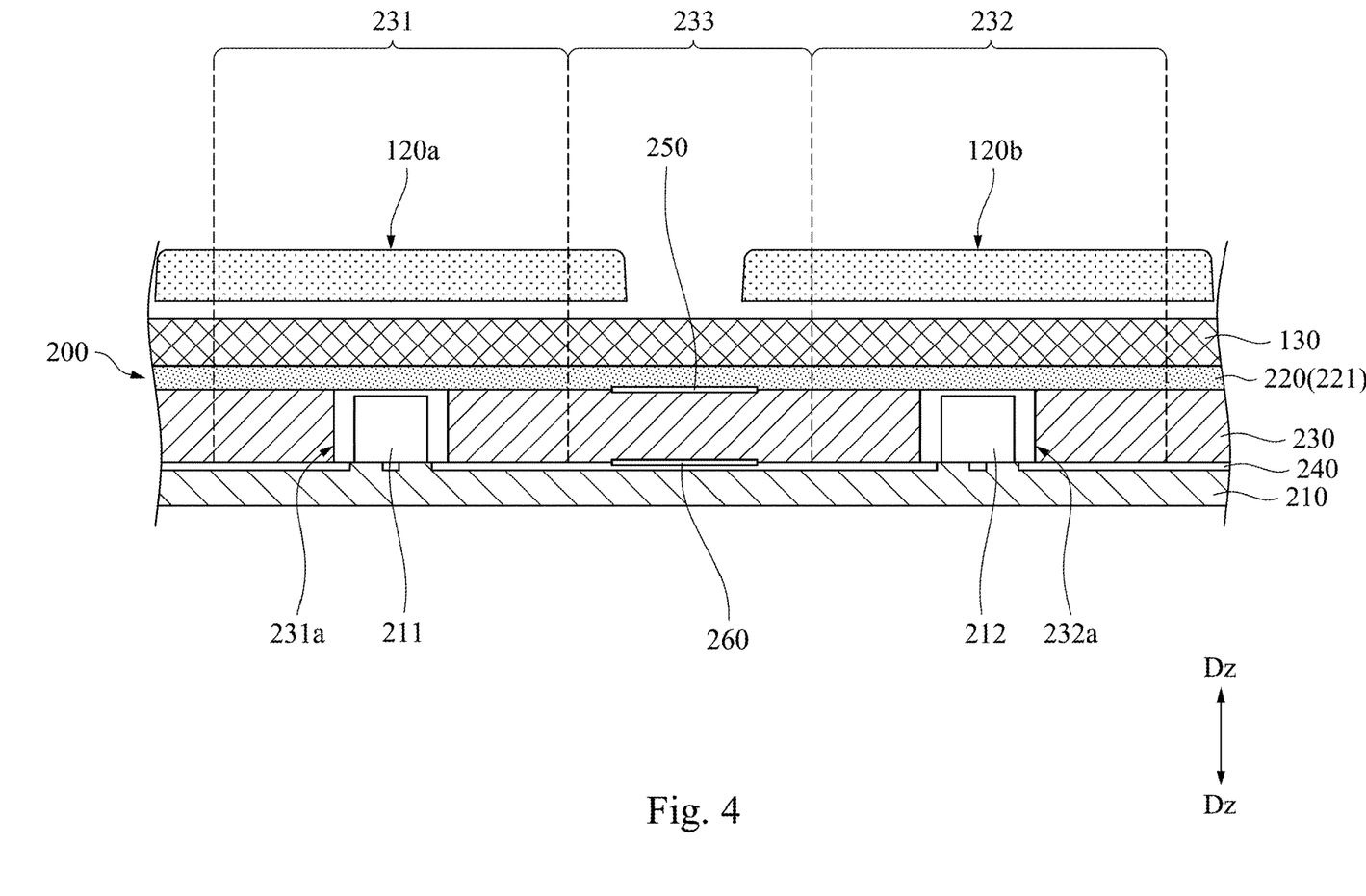
FIG. 4 is another cross-sectional view of the keyboard device in FIG. 1.

Reference is made to FIG. 4. FIG. 4 is another cross-sectional view of the keyboard device 100 in FIG. 1. As shown in FIG. 4, in the present embodiment, the keyboard device 100 further includes a first connection member 250 and a second connection member 260. The light-shielding plate 220 is adhered to the light guide plate 230 through the first connection member 250. The circuit board 210 is adhered to the light guide plate 230 through the second connection member 260. Specifically, the first connection member 250 and the second connection member 260 are disposed corresponding to the opaque area 233 of the light guide plate 230, and vertical positions of the first connection member 250 and the second connection member 260 relative to the shielding area 221 overlap (i.e., overlap in the vertical direction Dz). In this way, the light-shielding plate 220, the circuit board 210, and the light guide plate 230 can have substantially the same or similar amounts of expansion and contraction when the temperature changes, thereby further ensuring that the light guide plate 230 will not collide with the first light-emitting unit 211. In some other embodiments, the first connection member 250 and the second connection member 260 only partially overlap in the vertical direction Dz. In practical applications, one of the first connection member 250 and the second connection member 260 may be omitted.

Figure 5:
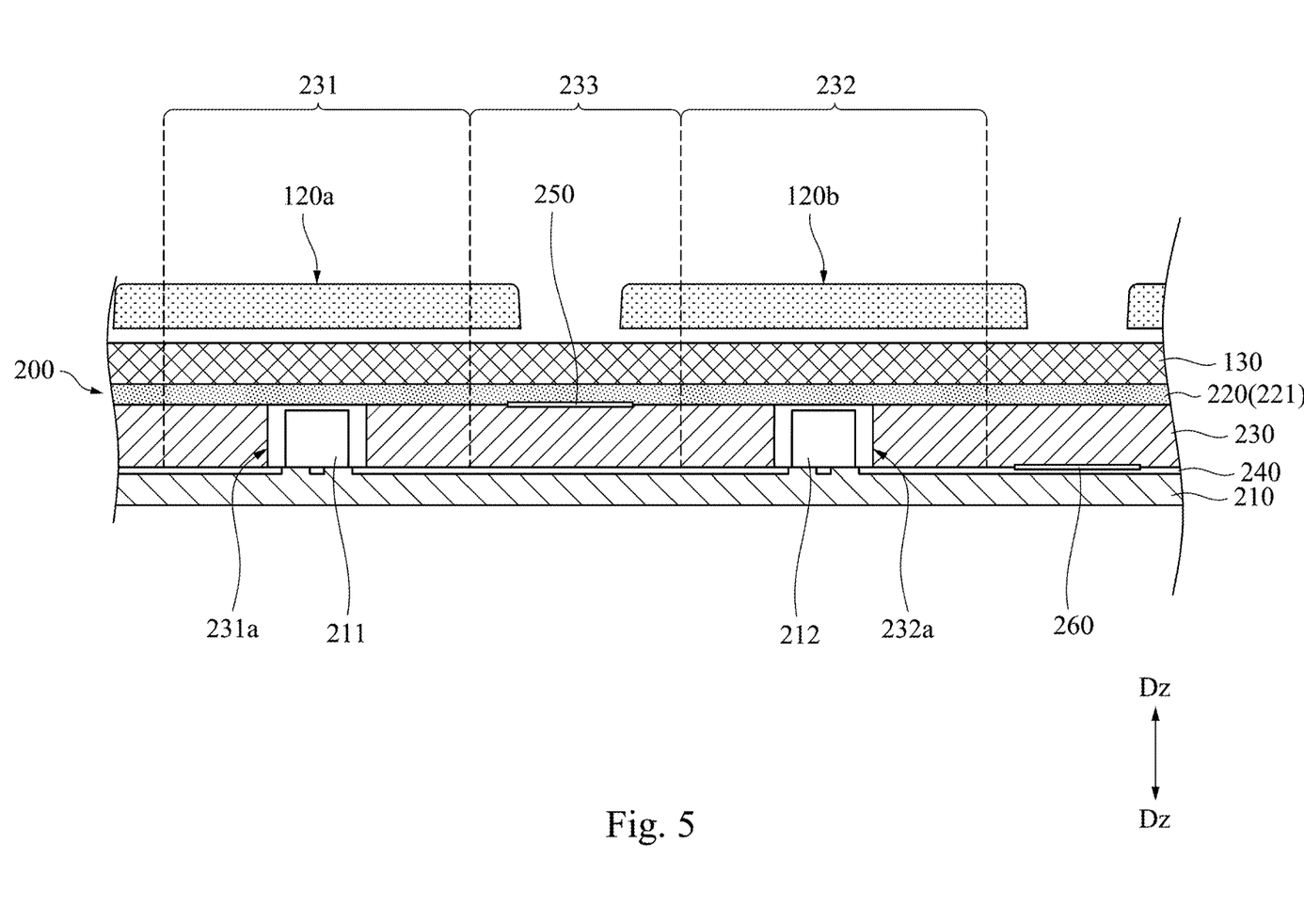
FIG. 5 is a partial cross-sectional view of a keyboard device according to another embodiment of the disclosure.
Figure 6:
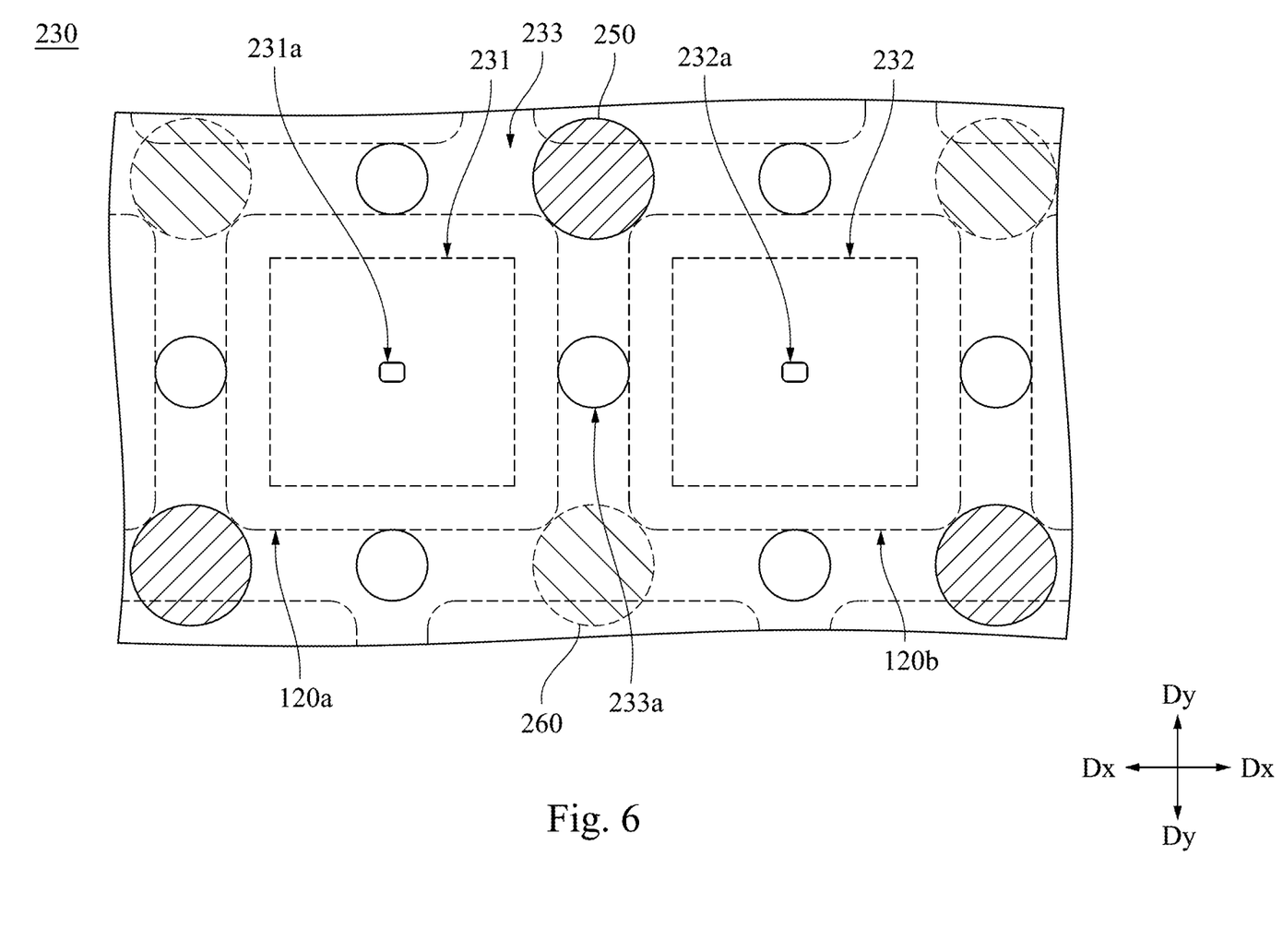
FIG. 6 is a partial top view of the keyboard device in FIG. 5.

Reference is made to FIGS. 5 and 6. FIG. 5 is a partial cross-sectional view of a keyboard device 100 according to another embodiment of the disclosure. FIG. 6 is a partial top view of the light guide plate 230 in FIG. 5. A difference between the present embodiment and the embodiment shown in FIG. 4 is that the vertical positions of the first connection member 250 and the second connection member 260 relative to the shielding area 221 do not overlap. By making the first connection member 250 and the second connection member 260 staggered, the overall thickness of the backlight module 200 can be prevented from being too large.

As shown in FIG. 6, in the present embodiment, taking the keyswitch assembly 120a as an example, the expansion/contraction holes 233a are disposed in the centers of the four sides of the keyswitch assembly 120a, and the first connection members 250 and the second connection members 260 are disposed at the corners of the keyswitch assembly 120a. Therefore, in addition to the aforementioned light-shielding effect provided by the expansion/contraction holes 233a in horizontal directions Dx, Dy, the first connection member 250 and the second connection member 260 can also provide a light reduction effect in directions inclined to the horizontal directions Dx, Dy.

Figure 7:
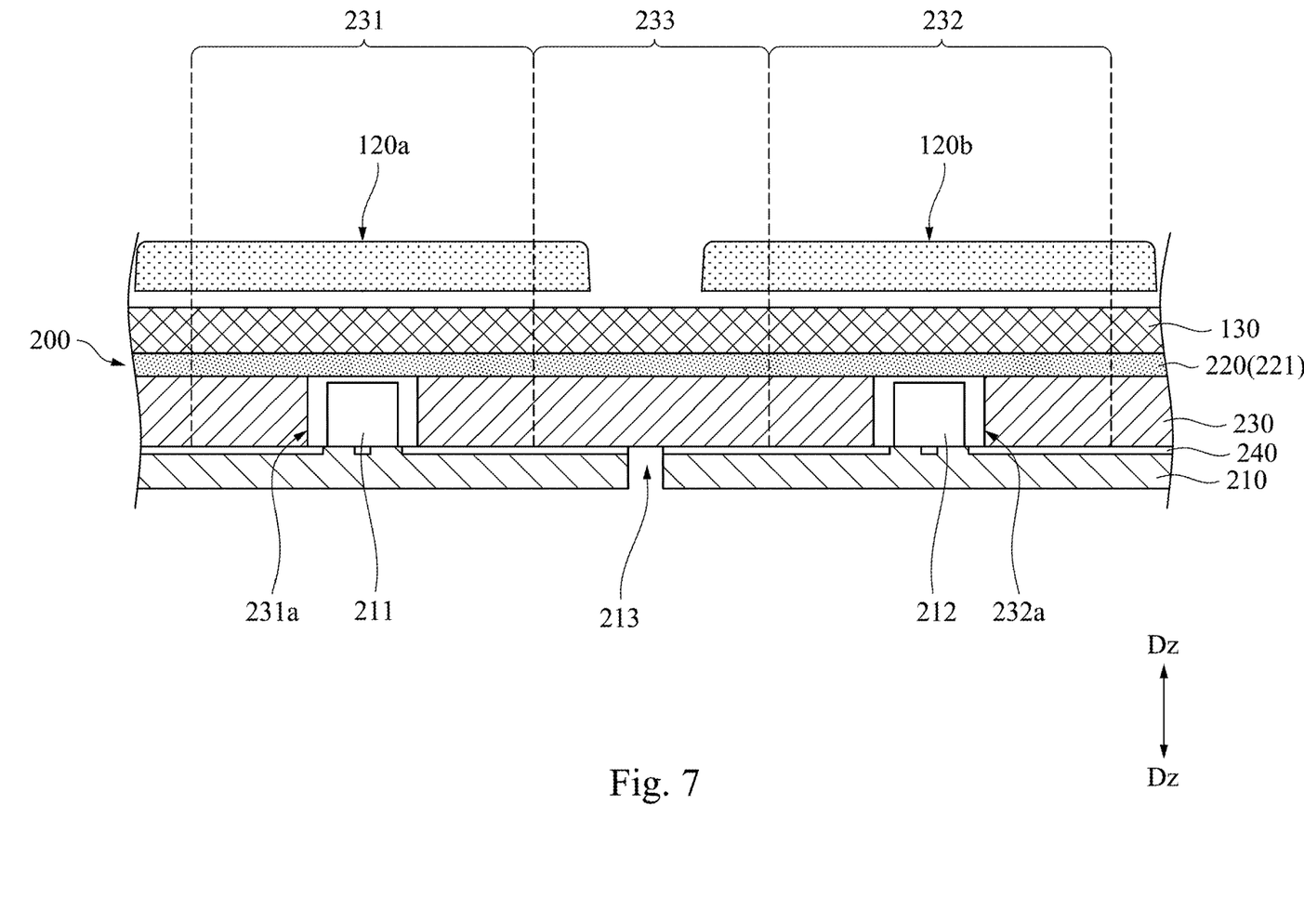
FIG. 7 is another partial cross-sectional view of the keyboard device in FIG. 1.

Reference is made to FIG. 7. FIG. 7 is another partial cross-sectional view of the keyboard device 100 in FIG. 1. As shown in FIG. 7, in the present embodiment, the circuit board 210 has an expansion/contraction hole 213 disposed corresponding to the shielding area 221. The expansion/contraction hole 213 may extend through the reflective layer 240. A vertical position of the expansion/contraction hole 213 of the circuit board 210 does not overlap a vertical position of the expansion/contraction hole 233a on the light guide plate 230, so as to avoid light leakage. By disposing the expansion/contraction hole 213 on the circuit board 210, in addition to effectively reducing the amount of expansion and contraction of the circuit board 210 when the temperature changes, the expansion/contraction hole 213 can also be used as an air vent between the light guide plate 230 and the circuit board 210.

In some other embodiments, the vertical position of the expansion/contraction hole 213 of the circuit board 210 may partially overlap the vertical position of the expansion/contraction hole 233a on the light guide plate 230, and the expansion/contraction hole 213 may not extend through the reflective layer 240.

Figure 8:
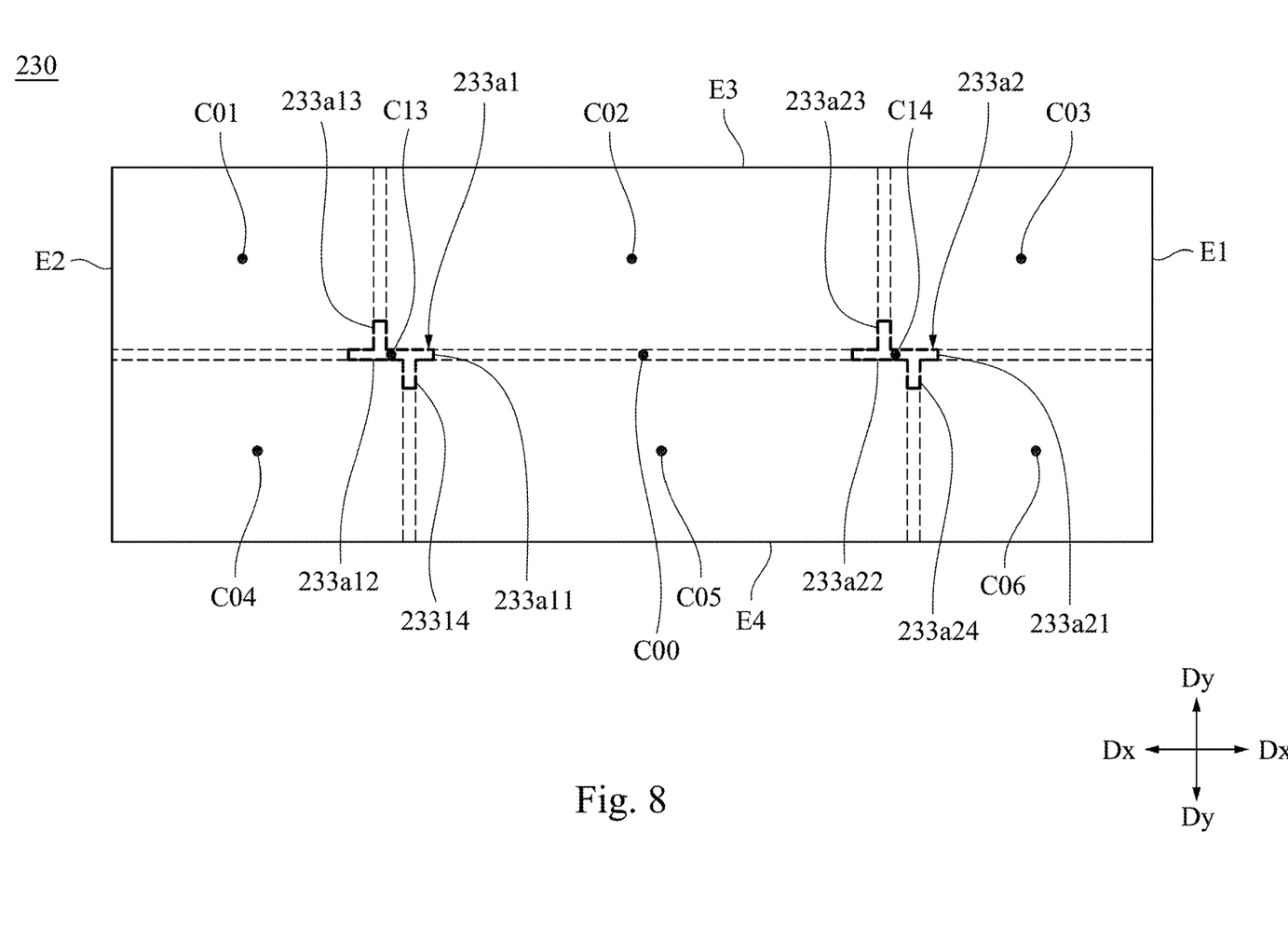
FIG. 8 is another top view of the keyboard device in FIG. 1.

Reference is made to FIG. 8. FIG. 8 is another top view of the keyboard device 100 in FIG. 1. As shown in FIG. 8, in the embodiment, the opaque area 233 further has expansion/contraction holes 233a1, 233a2 disposed corresponding to the shielding area 221. In order to make the drawings clear and concise, the substantially circular expansion/contraction holes 233a in FIG. 3 are omitted in FIG. 8. In some embodiments, only the expansion/contraction holes 233a1, 233a2 may be provided without the expansion/contraction holes 233a. A geometric center C13 of the expansion/contraction hole 233a1 and a geometric center C14 of the expansion/contraction hole 233a2 are respectively at substantially the same distance from the geometric center C00 of the light guide plate 230. A distance between the geometric center C13 of the expansion/contraction hole 233a1 and a first short edge E1 of the light guide plate 230 is substantially equal to a distance between the geometric center C14 of the expansion/contraction hole 233a2 and a second short edge E2 of the light guide plate 230. A distance between the geometric center C13 of the expansion/contraction hole 233a1 and the second short edge E2 of the light guide plate 230 is substantially equal to a distance between the geometric center C14 of the expansion/contraction hole 233a2 and the first short edge E1 of the light guide plate 230. A distance between the geometric center C13 of the expansion/contraction hole 233a1 and a first long edge E3 of the light guide plate 230 is substantially equal to a distance between the geometric center C14 of the expansion/contraction hole 233a2 and a second long edge E4 of the light guide plate 230. A distance between the geometric center C13 of the expansion/contraction hole 233a1 and the second long edge E4 of the light guide plate 230 is substantially equal to a distance between the geometric center C14 of the expansion/contraction hole 233a2 and the first long edge E3 of the light guide plate 230. In other words, the disposing positions of the expansion/contraction holes 233a1, 233a2 on the light guide plate 230 are symmetrical in the horizontal direction Dx and centered in the horizontal direction Dy.

Further, the expansion/contraction hole 233a1 has extension portions 233a11, 233a12 respectively extending toward the first short edge E1 and the second short edge E2 along the horizontal direction Dx and extension portions 233a13, 233a14 respectively extending toward the first long edge E3 and the second long edge E4 along the horizontal direction Dy. In addition, the expansion/contraction hole 233a2 has extension portions 233a21, 233a22 respectively extending toward the first short edge E1 and the second short edge E2 along the horizontal direction Dx and extension portions 233a23, 233a24 respectively extending toward the first long edge E3 and the second long edge E4 along the horizontal direction Dy. Extension lines (shown as dotted lines) of the extension portions 233a11, 233a12, 233a13, 233a14, 233a21, 233a22, 233a23, 233a24 of the expansion/contraction holes 233a1, 233a2 can divide the light guide plate 230 into six regions, and these regions respectively have geometric centers C01, C02, C03, C04, C05, C06. With the aforementioned configurations, the expansion/contraction holes 233a1, 233a2 can effectively interrupt the continuous expansion and contraction of the light guide plate 230 in the horizontal directions Dx, Dy, and can effectively reduce the amount of expansion and contraction of the light guide plate 230 when the temperature changes. In practical applications, the number of the divided regions of the light guide plate 230 may be flexibly changed (by changing the number of the expansion/contraction holes 233a1, 233a2). Also, as the number of divided regions increases, the amount of expansion and contraction of the light guide plate 230 when the temperature changes is smaller.

Figure 9:
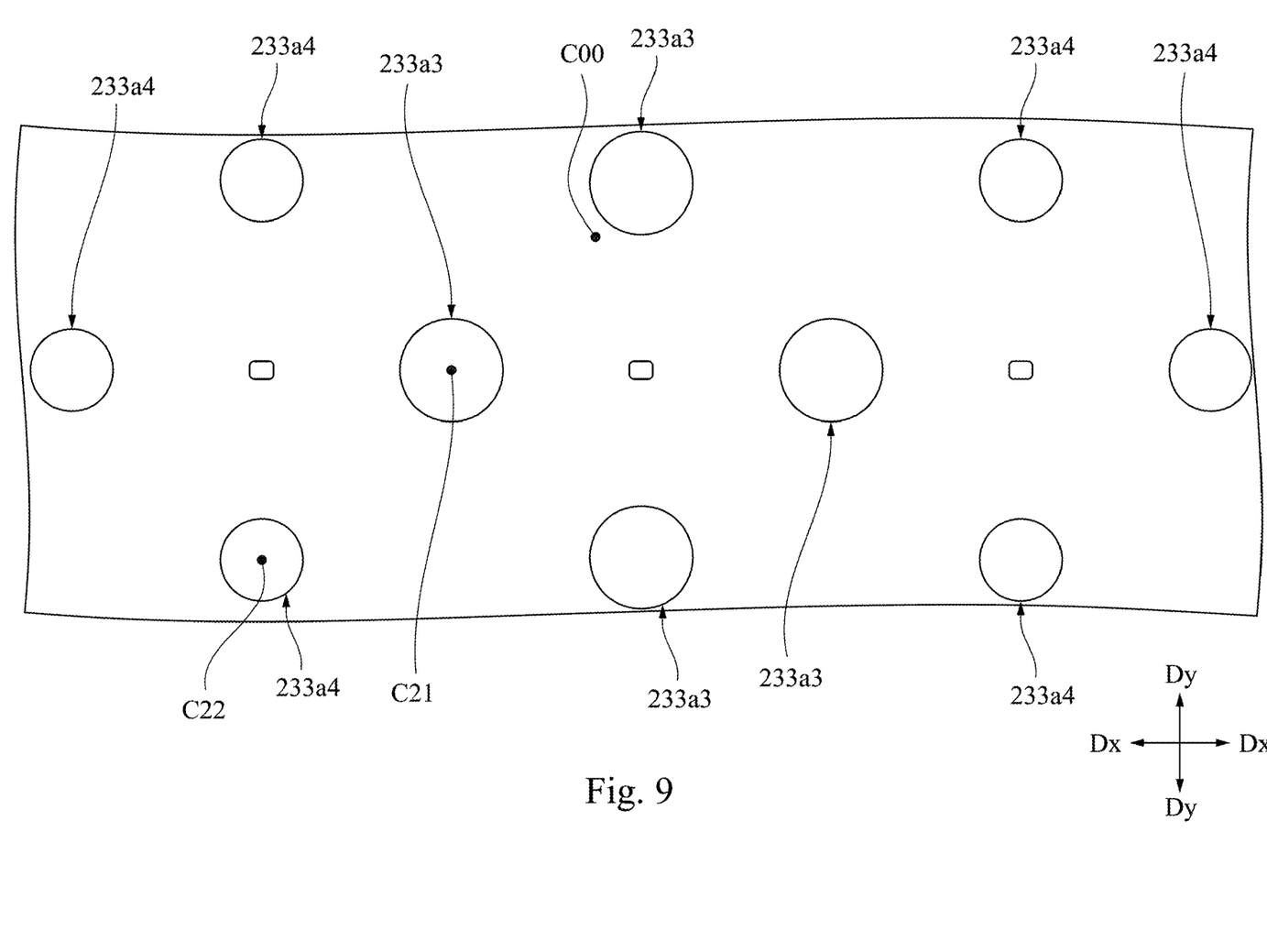
FIG. 9 is a partial top view of the keyboard device in FIG. 8.

Reference is made to FIG. 9. FIG. 9 is a partial top view of the keyboard device 100 in FIG. 8. As shown in FIG. 9, in the present embodiment, there are a plurality of expansion/contraction holes 233a3 and a plurality of expansion/contraction holes 233a4 around the geometric center C00 of the light guide plate 230. Taking the expansion/contraction hole 233a3 with the geometric center C21 and the expansion/contraction hole 233a4 with the geometric center C22 as examples, a distance between the geometric center C21 of the expansion/contraction hole 233a3 and the geometric center C00 of the light guide plate 230 is smaller than a distance between the geometric center C22 of the expansion/contraction hole 233a4 and the geometric center C00 of the light guide plate 230. It should be noted that when the temperature changes, the amount of expansion and contraction is larger at a position closer to the geometric center C00 of the light guide plate 230, and the amount of expansion and contraction is smaller at a position farther from the geometric center C00 of the light guide plate 230. By making the area of the expansion/contraction hole 233a3 larger than the area of the expansion/contraction hole 233a4, the amount of expansion and contraction of the light guide plate 230 when the temperature changes can be made more uniform. In addition, by making the area of the expansion/contraction hole 233a4 farther from the geometric center C00 of the light guide plate 230 smaller, the light guide plate 230 can achieve a balance between the amount of expansion and contraction and the structural strength. It should be noted that the aforementioned areas are areas viewed from a plan view of the light guide plate 230 along the vertical direction Dz.

In some embodiments, when the light guide plate 230 is divided into the aforementioned six regions, the expansion/contraction holes 233a3, 233a4 can also be disposed based on the geometric centers C01, C02, C03, C04, C05, C06 of the regions. For example, in the area with the geometric center C01, the expansion/contraction holes 233a3 with a larger area may be disposed at positions closer to the geometric center C01, and the expansion/contraction holes 233a4 with a smaller area may be disposed at positions farther from the geometric center C01, and the same applies to other regions.

According to the foregoing recitations of the embodiments of the disclosure, it can be seen that in the backlight module of the present disclosure, by making the current flowing through the first light-emitting unit farther from the geometric center of the light guide plate greater than the current flowing through the second light-emitting unit closer to the geometric center of the light guide plate, the problem of uneven light energy or poor light efficiency of the first light-emitting unit caused by the expansion and contraction of the light guide plate and the circuit board can be improved. By making the area of the first through hole of the light guide plate for accommodating the first light-emitting unit larger than the area of the second through hole for accommodating the second light-emitting unit, the problem that the light guide plate collides with the first light-emitting unit due to expansion and contraction can be effectively avoided. By disposing an expansion/contraction hole in the opaque area of the light guide plate, the amount of expansion and contraction of the light guide plate when the temperature changes can be effectively reduced. By covering the upper end and the lower end of the expansion/contraction hole with the light-shielding plate and the reflective layer respectively, light leakage at the expansion/contraction hole can be avoided. By making the area of the expansion/contraction hole farther from the geometric center of the light guide plate smaller, the light guide plate can achieve a balance between the amount of expansion and contraction and the structural strength. By disposing an expansion/contraction hole on the circuit board, in addition to effectively reducing the amount of expansion and contraction of the circuit board when the temperature changes, the expansion/contraction hole can also be used as an air vent between the light guide plate and the circuit board. By adhering connection members between the light-shielding plate and the light guide plate and/or between the circuit board and the light guide plate, the light guide plate and at least one of the light-shielding plate and the circuit board can have substantially the same or similar amount of expansion and contraction, thereby further ensuring that the light guide plate does not collide with the first light-emitting unit. By making the connection member adhered between the light-shielding plate and the light guide plate and the connection member adhered between the circuit board and the light guide plate staggered, the overall thickness of the backlight module can be prevented from being too large.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A backlight module, comprising:
   a circuit board provided with a first light-emitting unit and a second light-emitting unit;
   a light-shielding plate disposed above the circuit board and having a shielding area;
   a light guide plate disposed between the circuit board and the light-shielding plate and comprising:
   a first single-key light guide area having a first through hole accommodating the first light-emitting unit;
   a second single-key light guide area having a second through hole accommodating the second light-emitting unit; and
   an opaque area having a first expansion/contraction hole disposed corresponding to the shielding area;
   wherein a distance between a geometric center of the first single-key light guide area and a geometric center of the light guide plate is greater than a distance between a geometric center of the second single-key light guide area and the geometric center of the light guide plate,
   wherein a current flowing through the first light-emitting unit is greater than a current flowing through the second light-emitting unit.

2. The backlight module of claim 1, wherein an area of the first through hole is greater than an area of the second through hole.

3. The backlight module of claim 1, wherein an area of the first expansion/contraction hole is greater than an area of the first through hole or an area of the second through hole.

4. The backlight module of claim 1, further comprising a reflective layer disposed between the light guide plate and the circuit board, wherein the light-shielding plate covers an upper end of the first expansion/contraction hole, and the reflective layer covers a lower end of the first expansion/contraction hole.

5. The backlight module of claim 1, wherein the opaque area further has a second expansion/contraction hole disposed corresponding to the shielding area, a distance between a geometric center of the first expansion/contraction hole and the geometric center of the light guide plate is smaller than a distance between a geometric center of the second expansion/contraction hole and the geometric center of the light guide plate, and an area of the first expansion/contraction hole is greater than an area of the second expansion/contraction hole.

6. The backlight module of claim 5, wherein the circuit board has a third expansion/contraction hole disposed corresponding to the shielding area, and a vertical position of the third expansion/contraction hole does not overlap or partially overlaps a vertical position of the first expansion/contraction hole or a vertical position of the second expansion/contraction hole.

7. The backlight module of claim 1, wherein the opaque area further has a second expansion/contraction hole disposed corresponding to the shielding area, a geometric center of the first expansion/contraction hole and a geometric center of the second expansion/contraction hole are respectively at substantially the same distance from the geometric center of the light guide plate, a distance between the geometric center of the first expansion/contraction hole and a first short edge of the light guide plate is substantially equal to a distance between the geometric center of the second expansion/contraction hole and a second short edge of the light guide plate, and a distance between the geometric center of the first expansion/contraction hole and a first long edge of the light guide plate is substantially equal to a distance between the geometric center of the second expansion/contraction hole and a second long edge of the light guide plate.

8. The backlight module of claim 1, wherein the first expansion/contraction hole is located between the first light-emitting unit and the second light-emitting unit, and is configured to block optical crosstalk between the first light-emitting unit and the second light-emitting unit.

9. The backlight module of claim 1, wherein one of the light-shielding plate and the circuit board is adhered to the light guide plate through a first connection member.

10. The backlight module of claim 9, wherein another of the light-shielding plate and the circuit board is adhered to the light guide plate through a second connection member.

11. The backlight module of claim 10, wherein vertical positions of the first connection member and the second connection member relative to the shielding area do not overlap or partially overlap.

\* \* \* \* \*